United States Patent
Kang et al.

(10) Patent No.: US 8,237,303 B2
(45) Date of Patent: Aug. 7, 2012

(54) ORGANIC RANKINE CYCLE (ORC) TURBO GENERATOR FOR PREVENTION OF PENETRATION OF WORKING FLUID

(75) Inventors: Seok-Hun Kang, Daejeon (KR); Dae-Hun Chung, Daejeon (KR); Byung-Sik Park, Daejeon (KR)

(73) Assignee: Korea Institute of Energy Research (KR)

( * ) Notice: Subject to any disclaimer, the term of this patent is extended or adjusted under 35 U.S.C. 154(b) by 355 days.

(21) Appl. No.: 12/712,059

(22) Filed: Feb. 24, 2010

(65) Prior Publication Data

US 2011/0062711 A1 Mar. 17, 2011

(30) Foreign Application Priority Data

Sep. 17, 2009 (KR) .................. 10-2009-0088177

(51) Int. Cl.
*H02K 7/18* (2006.01)
*F01D 15/10* (2006.01)
*H02P 9/04* (2006.01)
*F02C 6/00* (2006.01)

(52) U.S. Cl. ......................................................... 290/52
(58) Field of Classification Search ..................... 290/52
See application file for complete search history.

(56) References Cited

U.S. PATENT DOCUMENTS

2011/0164958 A1* 7/2011 Saitoh ............................. 415/1
* cited by examiner

*Primary Examiner* — Javaid Nasri
(74) *Attorney, Agent, or Firm* — Cantor Colburn LLP

(57) ABSTRACT

An organic rankine cycle (ORC) turbo generator for prevention of penetration of a working fluid is provided, which can block penetration of the working fluid from a turbine into a generator, thereby improving the efficiency of power generation. The turbo generator comprises: a turbine including a turbine housing, a turbine blade and a fluid injection nozzle; a generator including a generator housing connected to the turbine housing, a rotor rotatably mounted inside the generator housing and a rotary shaft mounted to the turbine blade, and a first bearing and a second bearing mounted at the front and rear ends of the rotor; and working fluid penetration-preventing means adapted to block the pressure generated from the turbine so as to prevent the working fluid injected from the fluid injection nozzle from being penetrated into the generator.

7 Claims, 2 Drawing Sheets

ORGANIC RANKINE CYCLE (ORC) TURBO GENERATOR FOR PREVENTION OF PENETRATION OF WORKING FLUID

CROSS-REFERENCE TO RELATED APPLICATIONS

This application claims the benefit of Korean Patent Application No. 10-2009-0088177, filed on Sep. 17, 2009 in the Korean Intellectual Property Office, which is incorporated herein by reference in its entirety.

BACKGROUND OF THE INVENTION (a) Field of the Invention

The present invention relates to an organic rankine cycle (ORC) turbo generator for prevention of penetration of a working fluid, which can block penetration of the working fluid from a turbine into a generator, thereby improving the efficiency of power generation.

(b) Background of the Related Art

In general, an organic rankine cycle (ORC) is a rankine cycle which uses an organic medium as a working fluid. The organic rankine cycle (ORC) system is a system which recovers heat from heat sources in a low-temperature range of 60 to 200° C. to produce electricity. The ORC system employs, as the working fluid, a Freon-based refrigerant which has a low boiling point and a high evaporation pressure in view of the characteristics of the ORC system which requires production of high-pressure gas at low temperature to drive a turbine.

In this case; the Freon-based refrigerant used as the working fluid possesses the characteristics of dissolving a rubricating oil. Even though a seal is installed between the generator and the turbine, a high-pressure working fluid introduced into the turbine to drive the turbine is penetrated in a certain amount into the generator due to a difference in pressure between the turbine and the generator to dissolve a bearing lubricant, thereby deteriorating the driving performance of the generator.

SUMMARY OF THE INVENTION

Accordingly, the present invention has been made to solve the above problems occurring in the prior art, and it is an object of the present invention to provide an organic rankine cycle (ORC) turbo generator for prevention of penetration of a working fluid, which can block penetration of the working fluid from a turbine into a generator, thereby improving the efficiency of power generation.

Another object of the present invention is to provide an organic rankine cycle (ORC) turbo generator for prevention of penetration of a working fluid, which can block penetration of the working fluid from a turbine into a generator while reducing a frictional force generated when blocking the penetration of the working fluid.

Yet another of the present invention is to provide an organic rankine cycle (ORC) turbo generator for prevention of penetration of a working fluid, in which cooled air is supplied to a structure of blocking penetration of the working fluid from a turbine into a generator, thereby facilitating the blocking of the penetration of the working fluid.

To achieve the above objects, the present invention provides an organic rankine cycle (ORC) turbo generator for prevention of penetration of a working fluid, the turbo generator including: a turbine including a turbine housing, a turbine blade rotatably mounted inside the turbine housing, a fluid injection nozzle mounted inside the turbine housing so as to inject the working fluid to the turbine blade; a generator including a generator housing connected to the turbine housing, a rotor rotatably mounted inside the generator housing and a rotary shaft mounted to the turbine blade, and a first bearing and a second bearing mounted at the front and rear ends of the rotor so as to support the rotation of the rotary shaft; and working fluid penetration-preventing means mounted around the rotary shaft in front of the first bearing and adapted to block the pressure generated from the turbine so as to prevent the working fluid injected from the fluid injection nozzle from being penetrated into the generator.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, a preferred embodiment of the present invention will be described in further detail with reference to the accompanying drawings.

Figure 1:
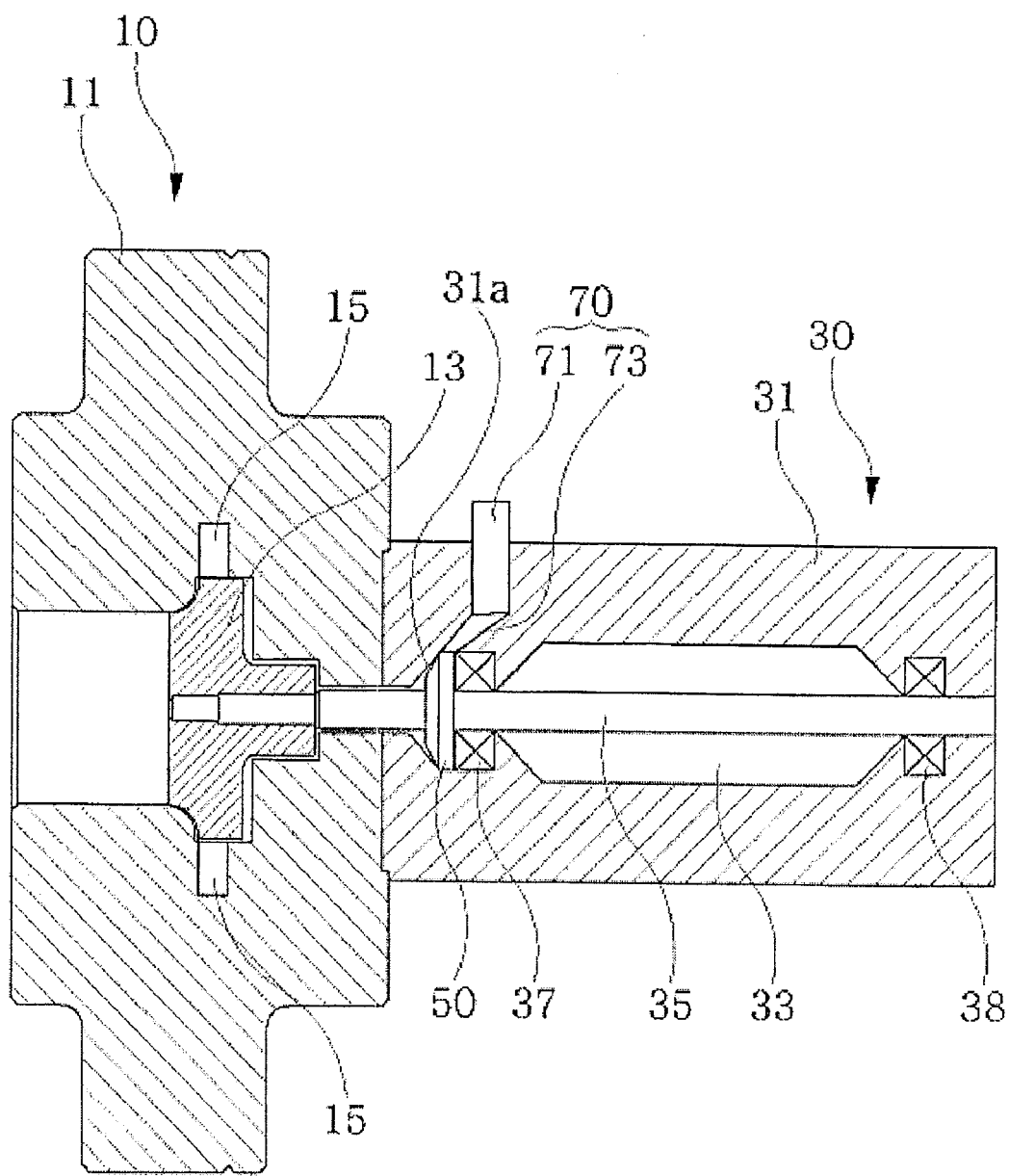
FIG. 1 is a cross-sectional view illustrating the inner construction of an organic rankine cycle (ORC) turbo generator for prevention of penetration of a working fluid according to a preferred embodiment of the present invention.
Figure 2:
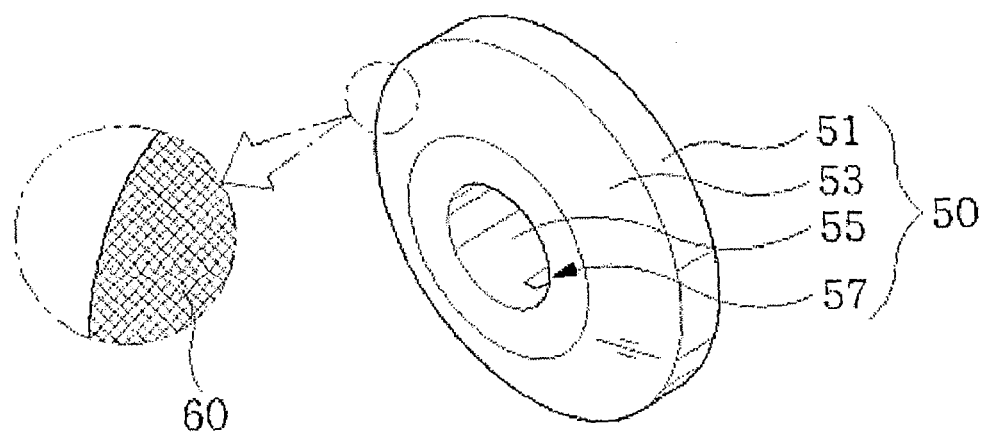
FIG. 2 is a perspective view illustrating a main element of FIG. 1.
Figure 3:
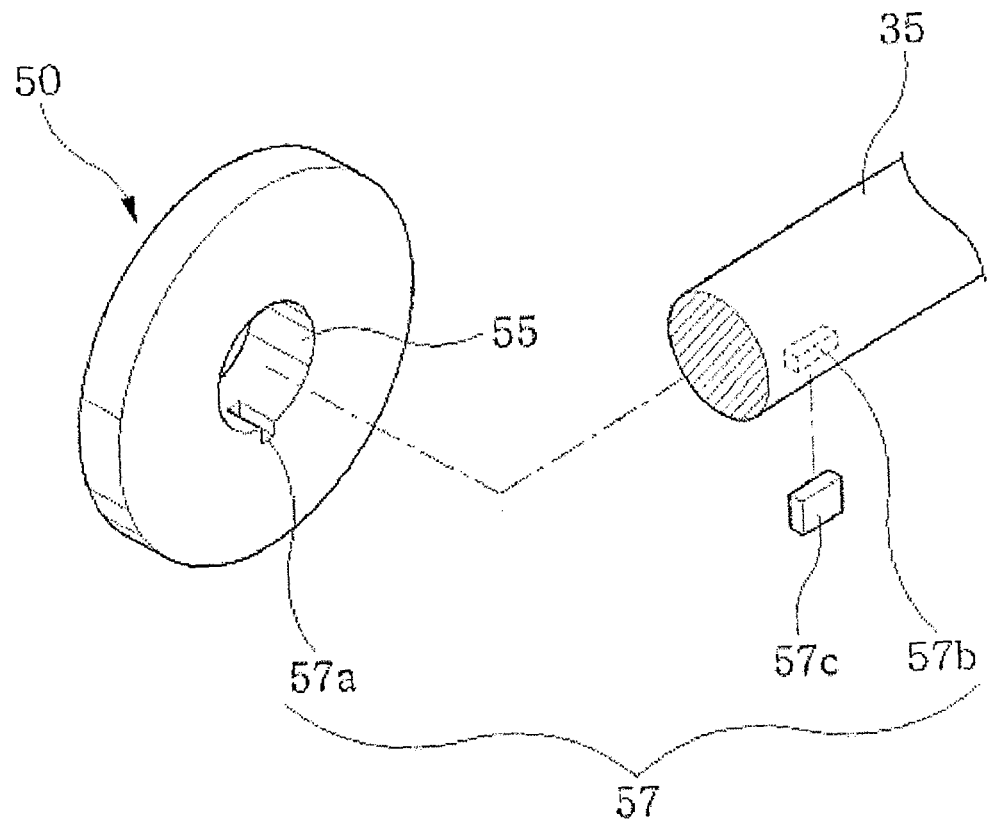
FIG. 3 is a perspective view illustrating the main elements of the present invention.

FIG. 1 is a cross-sectional view illustrating the inner construction of an organic rankine cycle (ORC) turbo generator for prevention of penetration of a working fluid according to a preferred embodiment of the present invention, FIG. 2 is a perspective view illustrating a main element of FIG. 1, and FIG. 3 is a perspective view illustrating the main elements of the present invention.

As shown in FIGS. 1 to 3, the organic rankine cycle (ORC) turbo generator for prevention of penetration of a working fluid according to the present invention includes: a turbine 10 including a turbine housing 11, a turbine blade 13 rotatably mounted inside the turbine housing 11, a fluid injection nozzle 15 mounted inside the turbine housing 11 so as to inject the working fluid to the turbine blade 13; a generator 30 including a generator housing 31 connected to the turbine housing 11, a rotor 33 rotatably mounted inside the generator housing 31 and a rotary shaft 35 mounted to the turbine blade 13, and a first bearing 37 and a second bearing mounted at the front and rear ends of the rotor 33, respectively, so as to support the rotation of the rotary shaft 35; and working fluid penetration-preventing means 50 mounted around the rotary shaft 35 in front of the first bearing 37 and adapted to block the pressure generated from the turbine 10 so as to prevent the working fluid injected from the fluid injection nozzle 15 from being penetrated into the generator 30.

Here, the turbine blade 13 rotates at a high speed of more than 10,000 rpm so that when the rotor 33 mounted around the rotary shaft 35 is rotated, the generator 30 produce electricity. The efficiency of power generation is approximately 70%, which is the highest in an electric generation expansion system. A stator (not shown) corresponding to the rotor 33 is provided at the outside of the rotor 33.

In this case, when the working fluid injected from the fluid injection nozzle 15 is injected to the outer surface of the turbine blade 13, the turbine blade 13 can be rotated easily without any friction inside the turbine housing 11. In addition, the fluid injection nozzle 15 can be symmetrically disposed at the outside of the turbine blade 13 so as to perform injection of the working fluid.

Also, the working fluid penetration-preventing means 50 is rotated together with the rotation of the rotary shaft 35 so as to prevent penetration of the working fluid from the turbine 10 into the generator 30.

The working fluid penetration-preventing means 50 includes: a disc-like rotating member 51 having a conical outer sloping surface 53 formed on a front side thereof so as to be brought into close contact with a sloping surface 31a formed on the inner front side of the generator housing 31 and an insertion hole 55 penetratingly formed axially in the center of the rotating member 51; and retaining means 57 adapted to allow the rotating member 51 to be retained by the rotary shaft 35.

The working fluid penetration-preventing means 50 is retainingly held in a state of being fitted around the rotary shaft 35 so that it is rotated together with the rotation of the rotary shaft 35 so as to prevent penetration of the working fluid from the turbine 10 into the generator 30.

In addition, the retaining means 57 includes a retaining groove 57a formed on the inner peripheral surface of the insertion hole 55 of the rotating member 51, a fixing groove 57b formed on the outer peripheral surface of the rotary shaft 35, and a retaining pin 57c fitted into the retaining groove 57a and the fixing groove 57b.

The working fluid penetration-preventing means 50 further includes friction-reducing means 60 adapted to minimize the friction between the outer sloping surface 53 and the sloping surface 31a. Preferably, the friction-reducing means 60 is composed of a plurality of fine slits formed on the outer sloping surface 53 of the rotating member 51.

Here, the fine slits constituting the friction-reducing means 60 may be formed in the shape of a radial, grid, comb pattern or the like. In this case, the fine slits function as air pockets for therein accommodating cooled air which will be described later so as to prevent penetration of the working fluid from the turbine 10 into the generator 30.

Preferably, the working fluid penetration-preventing means 50 is mounted around the rotary shaft 35 in such a fashion as to be brought at a front end thereof into close contact with the sloping surface 31a formed on the inner front side of the generator housing 31 and is brought at a rear end thereof into close contact with a front end of the first bearing 37 so that the working fluid penetration-preventing means 50 is rotated while pressurizing the inner sloping surface 31a of the generator housing 31.

Here, since the conical outer sloping surface 53 of the working fluid penetration-preventing means 50 is rotated while pressurizing the inner sloping surface 31a of the generator housing 31 in a state of being in close contact with the inner sloping surface 31a, the working fluid from the turbine 10 is not penetrated into the generator 30 but stays inside the turbine 10.

The organic rankine cycle (ORC) turbo generator of the present invention further includes an air supply unit 70 adapted to supply air to a side of the working fluid penetration-preventing means 50 so as to prevent penetration of the working fluid from the turbine 10 into the generator 30. The air supply unit 70 includes: a cooling tube 71 adapted to allow cooled air supplied from the outside to be introduced into the generator housing 31 therethrough; and a injection nozzle 73 adapted to inject the cooled air introduced into the generator housing 31 through the cooling tube 71 between the inner sloping surface 31a of the generator housing 31 and the conical outer sloping surface 53 of the working fluid penetration-preventing means 50.

Here, the cooling tube 71 is penetratingly mounted in the generator housing 31. The injection nozzle 73 is connected at one end thereof to a distal end of the cooling tube 71 and is positioned at the other end thereof in proximity to a point between the inner sloping surface 31a of the generator housing 31 and the conical outer sloping surface 53 of the working fluid penetration-preventing means 50. Thus, when the working fluid penetration-preventing means 50 is rotated, the cooled air is supplied to the front side of the working fluid penetration-preventing means 50 so that the flow of the working fluid is forcibly pushed toward the turbine 10 while being cooled so that the working fluid from the turbine 10 is prevented from being penetrated into the generator 30.

As described above, the present invention has an advantageous effect that the working fluid from the turbine is blocked from being penetrated into the generator, thereby improving the efficiency of power generation.

Also, the present invention has an advantageous effect that the working fluid from the turbine is blocked from being penetrated into the generator while reducing a frictional force generated when blocking the penetration of the working fluid.

Further, the present invention has an advantageous effect that the working fluid penetration-preventing means is rotated while pressurizing the inner sloping surface of the generator housing in a state of being in close contact with the inner sloping surface, so that working fluid from the turbine is prevented from being penetrated into the generator.

Moreover, the present invention has an advantageous effect that cooled air is supplied to a structure of blocking penetration of the working fluid from a turbine into a generator, thereby facilitating the blocking of the penetration of the working fluid.

While the present invention has been described with reference to the particular illustrative embodiments, it will be understood by those skilled in the art to which the present invention pertains that the technical construction of the present invention can be implemented in other concrete forms without modifying the technical spirit or essential features of the present invention.

Therefore, the disclosed embodiments should be considered in view of explanation, but no limitation. The technical scope of the present invention is taught in the appended claims, but not the aforementioned detailed description. All modifications or changes derived from the meaning and scope of the claims and the equivalent concept thereof should be construed as falling within the present invention.

What is claimed is:

1. An organic rankine cycle (ORC) turbo generator for prevention of penetration of a working fluid, comprising:
   a turbine (10) including a turbine housing (11), a turbine blade (13) rotatably mounted inside the turbine housing (11), a fluid injection nozzle (15) mounted inside the turbine housing (11) so as to inject the working fluid to the turbine blade (13);
   a generator (30) including a generator housing (31) connected to the turbine housing (11), a rotor (33) rotatably mounted inside the generator housing (31) and a rotary shaft (35) mounted to the turbine blade (13), and a first bearing (37) and a second bearing (38) mounted at the front and rear ends of the rotor (33), respectively, so as to support the rotation of the rotary shaft (35); and
   working fluid penetration-preventing means (50) mounted around the rotary shaft (35) and adapted to block the pressure generated from the turbine (10) so as to prevent the working fluid injected from the fluid injection nozzle (15) from being penetrated into the generator (30).

2. The organic rankine cycle (ORC) turbo generator according to claim 1, wherein the working fluid penetration-preventing means (50) comprises:

a disc-like rotating member (51) having a conical outer sloping surface (53) formed on a front end thereof so as to be brought into close contact with a sloping surface (31a) formed on an inner front side of the generator housing (31) and an insertion hole (55) penetratingly formed axially in the center of the rotating member (51); and retaining means (57) adapted to allow the rotating member (51) to be retained by the rotary shaft (35).

3. The organic rankine cycle (ORC) turbo generator according to claim 2, wherein the working fluid penetration-preventing means (50) further comprising friction-reducing means (60) adapted to minimize the friction between the outer sloping surface (53) and the sloping surface (31a), the friction-reducing means (60) being composed of a plurality of fine slits formed on the outer sloping surface (53).

4. The organic rankine cycle (ORC) turbo generator according to claim 3, further comprising an air supply unit (70) adapted to supply air to a side of the working fluid penetration-preventing means (50) so as to prevent penetration of the working fluid from the turbine (10) into the generator (30), the air supply unit (70) comprising: a cooling tube (71) adapted to allow cooled air supplied from an outside to be introduced into the generator housing (31) therethrough; and an injection nozzle (73) adapted to inject cooled air introduced into the generator housing (31) through the cooling tube (71) between an inner sloping surface (31a) of the generator housing (31) and the conical outer sloping surface (53) of the working fluid penetration-preventing means (50).

5. The organic rankine cycle (ORC) turbo generator according to claim 2, further comprising an air supply unit (70) adapted to supply air to a side of the working fluid penetration-preventing means (50) so as to prevent penetration of the working fluid from the turbine (10) into the generator (30), the air supply unit (70) comprising: a cooling tube (71) adapted to allow cooled air supplied from an outside to be introduced into the generator housing (31) therethrough; and an injection nozzle (73) adapted to inject cooled air introduced into the generator housing (31) through the cooling tube (71) between an inner sloping surface (31a) of the generator housing (31) and the conical outer sloping surface (53) of the working fluid penetration-preventing means (50).

6. The organic rankine cycle (ORC) turbo generator according to claim 1, wherein the working fluid penetration-preventing means (50) is mounted around the rotary shaft (35) in such a fashion as to be brought at a front end thereof into close contact with the sloping surface (31a) formed on an inner front side of the generator housing (31) and is brought at a rear end thereof into close contact with a front end of the first bearing (37) so that the working fluid penetration-preventing means (50) is rotated while pressurizing an inner sloping surface (31a) of the generator housing (31).

7. The organic rankine cycle (ORC) turbo generator according to claim 1, further comprising an air supply unit (70) adapted to supply air to a side of the working fluid penetration-preventing means (50) so as to prevent penetration of the working fluid from the turbine (10) into the generator (30), the air supply unit (70) comprising: a cooling tube (71) adapted to allow cooled air supplied from an outside to be introduced into the generator housing (31) therethrough; and an injection nozzle (73) adapted to inject cooled air introduced into the generator housing (31) through the cooling tube (71) between an inner sloping surface (31a) of the generator housing (31) and a conical outer sloping surface (53) of the working fluid penetration-preventing means (50).

* * * * *